April 13, 1926.

J. H. WAGENHORST 1,580,977

CONNECTING PLATE LATCH

Filed June 25, 1921

Inventor
J. H. Wagenhorst
By
Hull Brock & West
Attys.

Patented Apr. 13, 1926.

1,580,977

UNITED STATES PATENT OFFICE.

JAMES H. WAGENHORST, OF JACKSON, MICHIGAN.

CONNECTING-PLATE LATCH.

Application filed June 25, 1921. Serial No. 480,387.

*To all whom it may concern:*

Be it known that I, JAMES H. WAGENHORST, a citizen of the United States, residing at Jackson, in the county of Jackson and State of Michigan, have invented a certain new and useful Improvement in Connecting-Plate Latches, of which the following is a full, clear, and exact description, reference being had to the accompanying drawings.

This invention relates generally to the connecting plate for connecting the ends of a transplit tire carrying rim, and more particularly to the latch for said plate and the manner of securing said latch to the rim end, the object of the invention being to utilize the valve stem hole as a means of connection and so constructing said latch as to permit the valve stem hole to perform its usual functions.

With these objects in view, the invention consists in the novel features of construction, all of which will be fully described hereinafter and pointed out in the claims.

Figure 1:
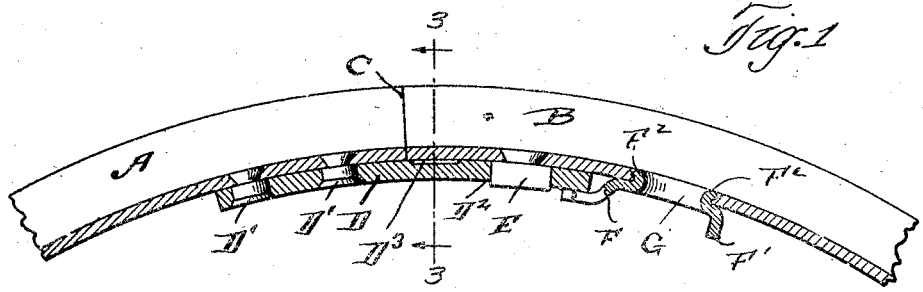
Figure 2:
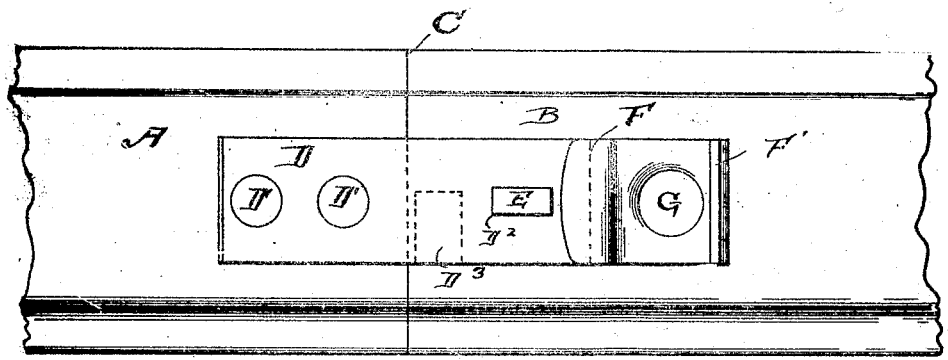
Figure 3:
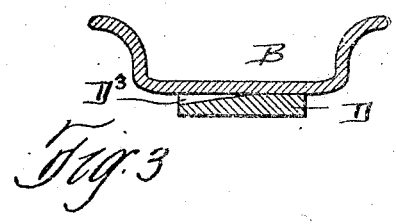

In the drawings forming a part of this specification Fig. 1 is a vertical sectional view of the rim ends, connecting plate and latch; Fig. 2 is an inverted plan view of the same; and Fig. 3 is a detail sectional view on the line 3—3 of Fig. 1.

Referring to the drawings A indicates one end of a transplit rim and B the other end, the point of division being indicated at C. D is a connecting plate secured to the end A by rivets D', the said plate projecting beyond the end of rim and having an opening D² which receives a stud E carried by the other end of the rim, and a latch F locks the free end of the plate in engagement with said stud.

The latch F is pivotally connected to the rim so it can be turned into or out of engagement with the end of the connecting plate, and to effect this pivotal connection I provide an opening G in the latch, circular in shape, and turn the edges F² outwardly over the edges of the valve stem opening, the opening G being brought into alignment with said valve stem hole and the edges of its opening eyeletted over the edges of the valve stem hole, providing a pivotal connection for the latch and at the same time providing a hole for the valve stem.

The latch is also formed with a flange or edge F' for engagement with a tool for manipulation.

It will thus be seen that I provide a simple and efficient latch connection at the point desired and which utilizes the valve stem hole without impairing its usual functions and at the same time a good pivotal connection is obtained.

Having thus described my invention, what I claim is:

1. The combination with a transplit tire carrying rim, of a connecting plate attached to one end of said rim and projecting beyond the said end, said projecting end being apertured, a stud carried by the opposite end of the rim and engaging said aperture, and a latch having an eyelet connection with said rim at the valve stem opening.

2. The combination with a transplit tire carrying rim, of a connecting plate rigidly connected to one end of said rim and projecting beyond the split, a lug carried by the opposite end of said rim, said lug being engaged by the free end of said plate, a latch carried also by the rim and adapted to engage the free end of said plate, said latch having an opening coinciding with the valve stem opening in the rim, the edges of said latch opening being eyeletted into the valve stem opening and providing a pivotal connection between said latch and rim.

In testimony whereof, I hereunto affix my signature.

JAMES H. WAGENHORST.